March 5, 1946.  T. A. TE GROTENHUIS  2,395,920
METHOD AND APPARATUS FOR PRODUCING POROUS ARTICLES
Filed April 20, 1942  2 Sheets-Sheet 1
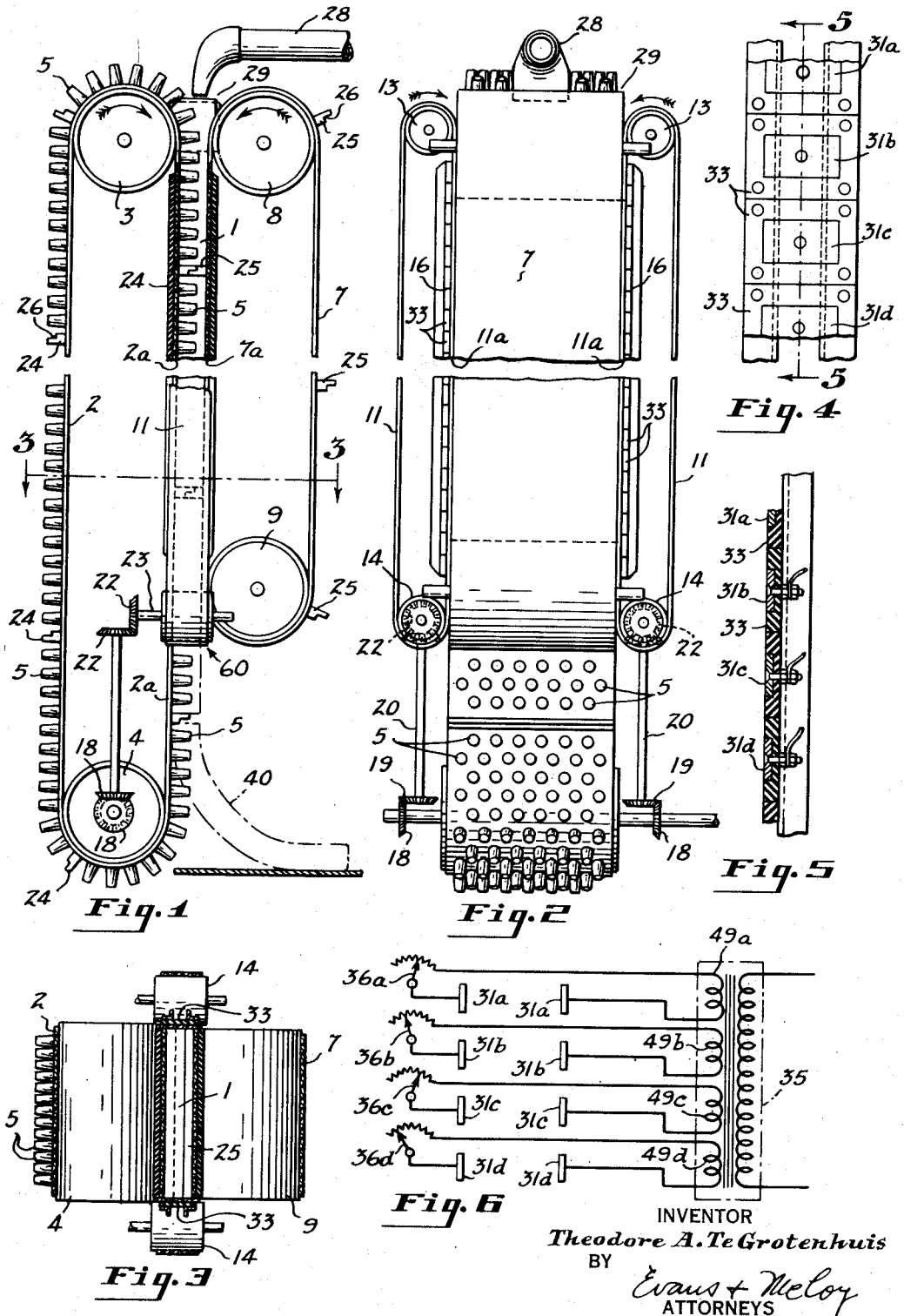
INVENTOR
Theodore A. Te Grotenhuis
BY
Evans + McCoy
ATTORNEYS

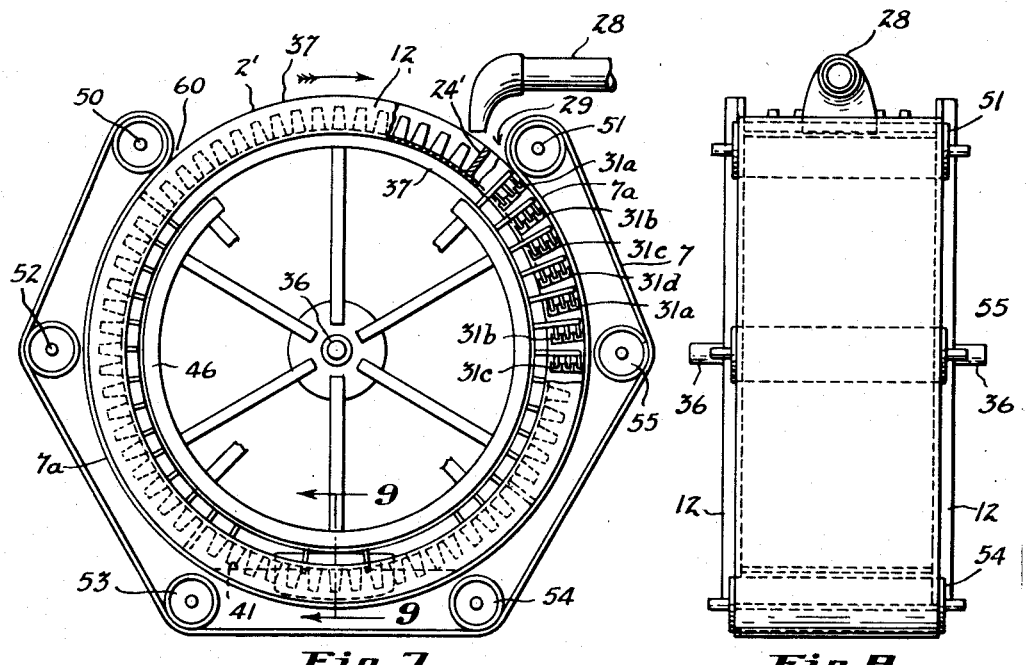
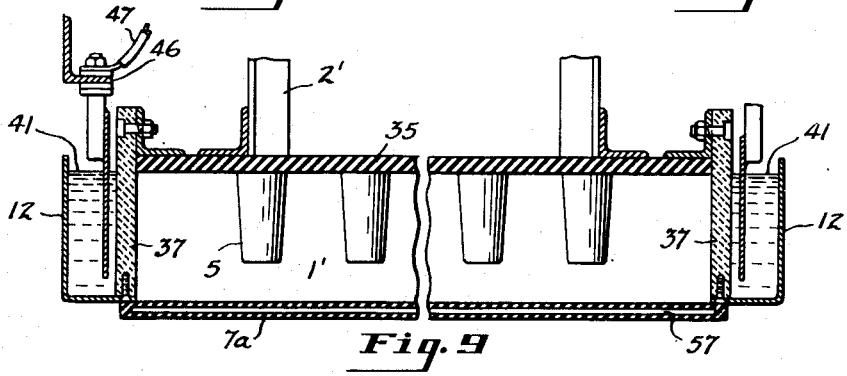
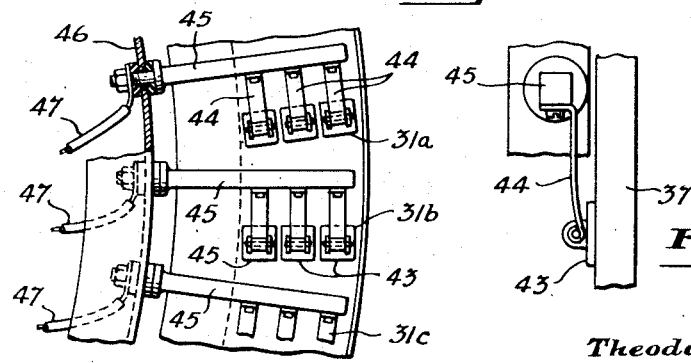

Patented Mar. 5, 1946

2,395,920

UNITED STATES PATENT OFFICE 2,395,920

METHOD AND APPARATUS FOR PRODUCING POROUS ARTICLES

Theodore A. Te Grotenhuis, Olmsted Falls, Ohio

Application April 20, 1942, Serial No. 439,676

20 Claims. (Cl. 18—5)

This invention relates to a process and apparatus for manufacturing porous rubber products, such as sponge rubber articles, from compounded, natural or artificial latex mixtures. It particularly relates to apparatus and to a method for manufacturing sponge rubber articles, such as mattresses, cushions, etc., wherein the articles may be produced rapidly in a substantially continuous manner from frothed latex.

In the usual processes for producing sponge rubber cushions and the like, compounded rubber latex is formed into a froth, a gelling agent is mixed with the froth, and the froth is then poured into a cold mold, allowed to gel, and cured by immersing the mold into hot water or steam. These processes are not entirely satisfactory since the heat must migrate from the exterior of the mold and it is difficult to cure the center of thick articles; also, the curing temperature cannot usually be raised above the boiling point of water without adversely affecting porosity of the article produced. Hence, a relatively long curing time is necessary to obtain a uniform cure.

In application Serial No. 215,419, filed June 23, 1938, by William E. Stewart, a method is proposed wherein electric current is passed through the frothed material so that heat is formed uniformly where it is needed in the froth and does not need to flow from exterior or concentrated points. Because the heat is uniform throughout all portions of the froth and substantially uniform vapor pressure is obtained in the various bubbles, the curing temperature may be substantially raised and the curing time substantially decreased without affecting the quality of the article. While the method proposed in the above-designated application is in general satisfactory, I have found that difficulty is sometimes experienced with polarization of the metallic electrodes, especially at the latter stages of cure.

It is an object of the present invention to provide a method and apparatus whereby the gases evolved in the curing of latex by electrolysis of the aqueous material are evolved in such a manner that they will not increase the resistance to current flow and do not come in contact with the froth or article being manufactured.

It is another object of the present invention to provide a method of producing sponge rubber cushions, mattresses and the like substantially continuously.

Another object of the present invention is to provide apparatus wherein sponge rubber articles having a non-uniform cross section or having cavities formed by spaced cores may be produced continuously.

It is a further object of the present invention to provide a method of producing sponge rubber articles from frothed material or artificial rubber dispersions wherein the froth is disposed between continuous rotating belts and gelled and vulcanized into sponge rubber without the necessity of a gelling agent, and wherein the usual curing time is materially shortened.

It is a still further object of the present invention to provide apparatus for producing thick sponge rubber articles in a more rapid and substantially continuous manner.

Other objects will be apparent from the following detailed description of the invention as illustrated by the accompanying drawing, in which:

Figure 1 is a schematic, side elevational view of apparatus embodying my invention and which may be utilized in preparing sponge rubber articles in a continuous manner;

Fig. 2 is a front elevational view of the apparatus of Fig. 1;

Fig. 3 is a sectional view on the line 3—3 of Fig. 1;

Fig. 4 is an enlarged view of a portion of the electrode structure showing electrodes which may be used for contacting the conducting side belts of the apparatus;

Fig. 5 is a sectional view on the line 5—5 of Fig. 4;

Fig. 6 is a schematic wiring diagram showing one way in which the electrodes on each side of the apparatus may be connected to supply current through the froth in the apparatus;

Fig. 7 is a schematic elevational view with portions broken away of a modified form of apparatus for continuously preparing sponge rubber articles in accordance with the present invention;

Fig. 8 is a side elevational view of the apparatus shown in Fig. 7;

Fig. 9 is a cross sectional view taken on the line 9—9 of Fig. 8;

Fig. 10 is an enlarged view of a portion of the apparatus of Fig. 8 with the outer angle ring broken away to show one arrangement for the electrodes; and Fig. 11 is an enlarged view, partly in section, of a portion of an electrode.

In accordance with the present invention the latex froth, which may or may not contain suitable amounts of a gelling or heat-sensitizing agent, is disposed in a suitable shaping chamber or mold with oppositely disposed portions of the froth in contact with spaced electrolytic conductors or porous material containing electrolyte. Electrical current is then passed between electrodes in series through the electrolyte of said electrolytic conductors and through the froth which makes contact with said conductors. The current is passed in sufficient amounts to cause gelling and preferably at least partial curing of the froth so that a sponge rubber is produced having the shape of the mold or forming chamber and which may be extracted from said forming chamber without permanently deforming the sponge.

The electrolytic conductors which contact the froth and conduct the current between the froth and the electrodes may be of any porous non-conducting material, such as porous, unglazed porcelain, wick fabric, etc., containing a conductive fluid such as an aqueous solution of electrolyte absorbed in its pores. Since the electrolytic conductors do not have metal or highly conductive solid material in contact with the latex froth, the ions carried by the current are carried completely through the ports of the porous material so that gas due to electrolysis of the material is evolved exteriorly of the forming or shaping chamber. The gas can thus escape to the atmosphere and will be removed from the surface of the electrodes, which contact the electrolytic conductors, by relative movement of these elements. The gas thus has no appreciable effect on increasing the resistance between the electrodes and the froth at the surface of the electrode has no tendency to become overheated at the later stages of cure due to the increased resistance caused by polarization.

Referring more particularly to the drawings wherein like parts are indicated by like numerals of reference throughout the several views, apparatus for forming sponge rubber articles from aqueous artificial and natural rubber dispersions may comprise a plurality of conveyors, such for example as a plurality of belts, suitably arranged to cooperate and define a shaping chamber or mold to receive frothed or foamed latex, means for supplying the froth to the shaping chamber, and means such as current supply for heating the froth in said chamber uniformly throughout as when the heat is generated in situ by conduction of current through the froth.

In the modification shown in Figs. 1 to 6, inclusive, the apparatus comprises an endless, downwardly inclined base member or belt 2, carried over rotatable drums 3 and 4, having an inner portion 2a that is substantially tangent to both of said drums. The base belt 2 is preferably of insulating material, and it may be a plurality of layers of rubberized fabric. A plurality of spaced mold members or pegs 5, which are adapted to displace latex froth and thus reduce the amount of froth required to produce a sponge rubber matrix of a given thickness, may be suitably carried by or fastened upon the outer surface of the base conveyor or belt 2.

A cover conveyor, which may be a belt 7, is carried by the rotatable drums 8 and 9. An inner straight portion 7a of the cover belt which is tangent to the drums 8 and 9 is substantially parallel to and spaced from inner portion 2a of the base belt 2, which is substantially tangent to the rotatable drums 3 and 4. The distance separating the portions 2a and 7a of the belts 2 and 7, respectively, may correspond to the molded thickness of the article to be produced. Backing plates 10 and 10a may be provided to press against the inner surface of the inner portions of belts 2 and 7, respectively, in order to insure that these portions remain in alignment. A side belt 11 is carried by rotatable drums 13 and 14 at each side of the inner portions of the belts 2 and 7. The inner portions 11a of the side belts 11 cooperate with the inner portions 2a and 7a, respectively, of the base belt 2 and cover belt 7 to form the shaping chamber 1, preferably of substantially rectangular cross section, to receive frothed latex and retain it during the gelling and preferably during at least a portion of the curing process.

Suitable means, such as guide members 16, are provided to bear against the edges of the inner portions 11a of the side belts to press them against the edges of the base member 2 and the cover member 7 and facilitate forming a seal between the inner portions of the base belt 2 and side belts 11 and between the inner portions of the cover belt 7 and the side belts 11. Means including bevel gears 18, which are carried on the shaft of the driven roller 4 and which cooperate with the bevel gears 19 carried on the shaft 20 that also carries the bevel gears 21 which cooperate with the gears 22 carried by the shaft 23, is provided for driving the conveyors at substantially the same linear speed by a suitable motor (not shown).

The base belt 2 preferably also carries spaced divider elements 24 separated by distances which may correspond to the length or width of the sponge or cushion being prepared. Divide elements 25 are carried by the cover conveyor or belt 7. The divider elements 24 and 25 extend across the entire surface of the belts 2 and 7. These elements are substantially identically spaced and have rabbeted portions 26 which are adapted to cooperate with each other and form a fluid seal. They thus divide the shaping chamber 1 into a plurality of closed shaping compartments.

Means which may include a froth supply tube 28, which is disposed adjacent an entrant end 29 of the shaping chamber 1 and which may be connected to a suitable latex frothing device, such for example as that disclosed in my prior application Serial No. 306,920, filed November 30, 1939, Patent No. 2,307,082, is provided for supplying frothed latex to the shaping chamber.

In accordance with the preferred aspect of the present invention, the portions of at least two opposite sides of the forming chambers that are adapted to contact the froth are of insulating material and the other two opposite sides are of porous conductive material containing electrolyte within the pores thereof. Thus the belts 2 and 7 are preferably of nonconductive solid material, such as rubberized fabric, etc., which is impervious to moisture, but the belts 11 are of open, flexible, porous material, such as heavy fabric or such material containing a substantial amount of a solution of an electrolyte, which is preferably a salt, such as sodium chloride, calcium chloride, sodium carbonate, sodium sulfate, or an acid or base that has no material effect upon the porous material.

At least one and preferably a plurality of insulated electrodes 31 are disposed in contact with the inner portion 11a of each of the side belts 11. The electrodes 31 may be part of the side guide or stiffening members 16 and electrodes 31a, 31b, 31c, 31d, etc., are preferably carried in suitable insulation material 33, which serves to insulate the separate electrodes 31a, 31b, 31c, etc., from each other. The electrodes 31 may be of metal and bear against the inner surface of the inner portion of the belts 11. The belts 11 serve as electrolytic conductors which contact both the latex and electrodes 31, 31a, 31b, 31c, etc., so that when current is passed between electrodes 31 on each side of the shaping channel 1 it passes from one electrode in series through a portion of the belt 11, through the frothed latex within the shaping compartment 1, and then through the second inner portion of the other belt 11 to the electrode 31 of opposite polarity.

Means, such as a suitable transformer 35 connected to a power supply (not shown, see Fig. 6) is provided for applying a potential difference between the electrodes 31 on each side of the shaping chamber 1. In order to insure the desired distribution of current throughout the froth within the forming chamber 1, the pairs of electrodes 31a, 31b, 31c, etc., are preferably connected to separate sources of alternating current and have means such as the resistances 36 for adjusting current flow. The separate sources of current are provided by separate insulated transformer windings for each pair of electrodes in a given area. If more than one pair of electrodes is to be connected to a given winding, the parallel pairs should preferably be spaced a substantial distance from each other. The electrolyte solution within the belts 11 has appreciable resistance and by separating the electrodes 31a, 31b, etc., by the insulation 33, use is made of the resistance of the electrode for preventing concentration of current along the entrance portion of the shaping chamber, or at other portions where conductivity might be greatest due to a lower degree of gelation of the froth.

In the modification shown in Figs. 7 to 11, inclusive, the base conveyor is a rotatable drum or wheel 2' which may take the place of the base belt 2 as well as the side belts 11 of the apparatus of Fig. 1. The mold members 5 as well as the separating members 24', which extend continuously between the side members 37 so as to cooperate with the inner portion 7a of the cover conveyor 7 to effect a seal between separate portions of the cavity 1', may be carried on the base portion 35 of the drum. The cover conveyor or belt 7 and the base portion 35 are of insulation material and make up opposite sides of the forming chamber. The drum is of relatively large diameter and is rotatably mounted about the axis 36. The side members 37, which may correspond to and function as the side belts 11, may be fixedly held or be integral with the base portion 35 when the base conveyor is of the drum type shown. They may be of non-flexible solids, such for example as unglazed porcelain which contains connecting fine pores adapted to carry electrolyte solution. The continuous cover conveyor 7 may be carried by the pulleys 50 and 51 with the aid of suitable auxiliary pulleys 52, 53, 54 and 55. The pulley 50 may be driven and suitably geared to the base member 2 so that the cover conveyor 7 travels without slippage relative thereto. The inner portion 7a extends over a substantial proportion of the outer periphery of the drum 2', forming a fluid seal, and with the cooperation of the side members and the base 35 forms the shaping chamber 1, which at the entrance end 29 is adapted to receive latex froth from the pipe 28. The edges of the cover conveyor bear against and form a fluid seal with the outer peripheral edges of the side members 37. To insure the maintenance of a substantially flat surface, stiffening members such as rods 57 may be suitably attached thereto. If the cover member is relatively thick, the small metal rods may be incorporated between plies thereof.

The spaced electrolytic conductors, which may be the side members 37 that are adapted to contact the frothed latex within the forming chamber 1, contain electrolyte solution within the connected pores of the relatively non-conductive material. Means such as a trough formed by the cooperation of the non-conductive side members 37 and the annular angles 42 carried by the drum 2 may be provided for supplying the porous solid with electrolyte solution so as to maintain the side members 37 in a conductive condition. The lower portion of the trough may contain electrolyte solution 41, such for example as an alkali metal acetate or other salt, acid or base, and by rotation of the drum the connected pores of the side member 37 are continuously wetted and filled with the electrolyte.

Electrodes 31 may be disposed about the periphery of the sides of the shaping chamber 1 for passage of current in series through the electrolyte within the pores of electrolytic conducting side members 37. The electrodes 31 may each comprise a plurality of contacting elements, such as plates 43, which are held against the conductive side members 37 by a spring arm 44. The spring arms 44 of each electrode 31 are carried by and make electrical contact with bracket arms 45. The bracket arms 45 are carried by and insulated from the mounting member 46. Connections 47 of each of the separate electrodes 31 may be suitably made to a source (Fig. 6) of alternating current of any frequency, including even zero frequency (direct current) although alternating current of a frequency below 100,000 cycles per second is much preferred.

Particularly since different portions of the froth have in a continuous process different stages of cure or different stages of heating, it is preferable that means be provided for preventing concentration of current at points where froth may be most conductive. Such means may consist of a separate source of current or a separate insulated winding 49 for each of the pairs of electrodes 31a, 31b, 31c, in a given area. A terminal of the separate winding 49a, for example, is connected to the electrode 31a on each side of the mold chamber 1', so that current from the winding 49a passes through the froth within the chamber 1'. The electrolyte solution within the side member 37 may be sufficiently dilute to provide substantial resistance to the passage of current lengthwise of the side members 37 so that a substantial drop in potential is caused by lengthwise current flow and compensates for differences in conductivity of the froth, so that heat in the different portions of the froth may be uniform or varied at will by adjustments of the resistance 36.

In the operation of the apparatus illustrated above, froth compounded, natural or artificial aqueous rubber dispersions, such for example as disclosed in the Stewart application Serial No. 215,419, filed June 23, 1938, is admitted from the feed pipe 28 to the entrance end 29 of the shaping cavity in sufficient amount to completely fill the same. The portions of the base member 2, the inner portion 7a of the cover member, and the electrolytic conductors or the side members which cooperate to form the cavity 1 are driven at substantially identical speed. The velocity of movement of the conveyors is such that the cavity remains substantially completely filled with froth. The froth which flows by gravity about the mold members 5 passes throughout the length of the shaping chamber at a relatively low rate of speed and during its progress therethrough current is passed between electrodes 31 in sufficient intensity to obtain the desired temperature so as to cause at least partial curing of the rubber of the froth, so that the shaped articles may be removed from the exit end 60 without permanently deforming the article. Since with conductive heating the heat is formed in situ throughout the froth and the vapor pressure is uniform throughout, the froth may when it is in a closed mold or in a closed portion of the shaping cavity between two seals formed by the divider or sealing elements 24 and 25 be cured at higher temperature than is practicable when all the heat must migrate from the outside of the mold. Thus, the intensity of the current may be increased to cause the curing in a relatively short time, even though the vapor pressure of the froth is higher than atmospheric pressure. The sponge rubber article 40 may be removed from the mold base member 2 at the exit end 60 of the shaping member by any suitable means. The sponge rubber article may then be washed and dried; if the article is not completely cured the curing may be completed by soaking it in hot water.

It will be seen that since in the passage of current through the froth, ions are not converted into gas until they reach a solid conductive surface, such as metal of the electrodes, gases are not evolved in contact with the froth. They are evolved in contact with electrodes 31, from which they are wiped by the relative movement of the electrolytic conductors. It is thus seen that the electrodes 31 do not become appreciably polarized and current conduction remains high. Since polarization at the outer surface of the froth in the shaping chamber does not occur, tendency for overcuring the surface froth contacting electrodes at the later stages is not present.

While I have chosen to illustrate the features of my invention with a continuous mold for making sponge rubber having spaced electrolytic conductors for making electrical contact with the latex froth, it is understood that single cavity molds may also be utilized. It is always preferable to have at least two of the electrolytic conductors at oppositely disposed portions of the mold cavity. The electrolytic conductors, each of which makes contact with an electrode, are insulated from each other except for the froth, so that current passed between electrodes passes in series through the electrolytic conductors and through the froth. However, especially in the case where direct current is utilized to cure the rubber of the froth in situ, a portion of the advantages of the present invention may be obtained by utilizing only one electrolytic conductor in conjunction with a metal electrode.

Aqueous dispersions of coagulated rubber, reclaim rubber, balata, gutta-percha or synthetic rubbers, especially those of the vulcanizable type, including polychloroprene, polymers of butadiene with one or more vinyl compounds, styrene, acrylic nitrile, olefins, etc., may be employed as alternatives for or as mixtures to the natural rubber latex described above. Accordingly, the terms "aqueous dispersions of rubber" or "rubber latex" as used in the appended claims includes these materials.

Aqueous dispersions of tacky, highly viscous liquid or incompletely polymerized or adherent synthetic resin-producing materials of various types, including even thermoplastic resins such as vinyl and acrylic resins, etc., may even be disposed between the electrodes and polymerized in situ, or otherwise treated by the action of the conducted current to raise the temperature of the dispersed particles so that a porous synthetic rubber or resin of the desired shape is produced.

In my process it is apparent that the particles of a dispersion of rubber, or of a dispersion of a member of the group consisting of rubber, thermoplastic resins and liquid, polymerizable resin forming material, are gelled or cured in situ. Appreciable amounts are not plated out of the liquid onto the electrodes as in the case of so-called electro-deposition processes.

It is to be understood that variations and modifications of the specific processes herein shown and described for purposes of illustration may be made without departing from the spirit of my invention.

What I claim is:

1. A method of forming sponge rubber articles from aqueous natural or artificial rubber dispersions which comprises forming a compounded rubber dispersion into a froth, incorporating said froth between and in contact with electrolyte in spaced electrolytic conductors, and passing a current through said electrolyte of said conductors into said froth between said conductors in sufficient intensity to cause said froth to retain the general shape of the mold cavity, whereby gases generated by electrolysis are not evolved in contact with the rubber of said latex.

2. A method of forming sponge rubber articles from aqueous natural or artificial rubber dispersions which comprises forming a compounded rubber dispersion into a froth, incorporating said froth in a forming area and in contact with electrolyte contained within a porous relatively nonconducting body, and passing a current in series through said electrolyte and through said froth in sufficient intensity and for sufficient time to cause said foam to form a sponge rubber which retains the shape of said forming area and which has sufficient strength to permit removal therefrom without permanently deforming it.

3. A method of forming sponge rubber articles from aqueous natural or artificial rubber dispersions which comprises forming a compounded rubber dispersion into a froth, incorporating said froth between endless conveyors to cause it to assume a desired shape, contacting opposite portions of said froth with electrolyte in a porous substantially non-conducting medium, and passing an electric current through said froth and in series through said electrolyte to form said froth into sponge rubber which retains said shape.

4. A method of forming sponge rubber articles from aqueous natural or artificial rubber dispersions which comprises forming a compounded rubber dispersion into a froth, incorporating said froth between endless conveyors to cause it to assume a shape corresponding to that desired for the sponge rubber articles, contacting opposite sides of said froth between said conveyors with electrolytic conductors containing electrolyte, and passing current in series through said electrolyte of said conductors and through said froth to cause said froth to retain the desired shape.

5. A method of forming sponge rubber articles from aqueous natural or artificial rubber dispersions which comprises forming a compounded rubber dispersion into a froth, incorporating said froth between endless conveyors to cause it to assume a shape corresponding to that desired for the sponge rubber articles, contacting said shaped froth between said conveyors with an electrolytic conductor containing electrolyte, and passing current in series through said electrolyte of said conductor and through said froth to cause said froth to retain the desired shape.

6. In apparatus for producing sponge rubber, a shaping chamber to receive a frothed latex and hold it to a shape desired for the sponge rubber, spaced electrodes at opposite portions of said chamber and adapted to make electrical contact with frothed latex in said chamber, an electrolytic conductor between at least one of said electrodes and said froth, which conductor has in a position adapted to contact froth in said chamber a porous non-conducting material adapted to contain electrolyte solution in its pores, and means for connecting said electrodes to pass electrical current between said electrodes in series with said electrolyte and said froth, whereby gas formed by electrolysis of said froth or of said electrolyte is evolved exteriorly of said forming chamber.

7. In apparatus for producing sponge rubber, a shaping chamber to receive a frothed latex and hold it to a shape desired for the sponge rubber, spaced electrolytic conductors within said chamber and adapted to contact oppositely disposed portions of said froth in said chamber, said electrolytic conductors comprising a relatively non-conducting porous material with a conducting liquid within its pores, means for supplying froth to said chamber, and electrodes for making electrical contact with said electrolyte, whereby gas generated by current passed between said electrodes passes in series through electrolyte in each conductor and through froth in said chamber is evolved exteriorly of said chamber.

8. In apparatus for producing sponge rubber articles, a shaping chamber to receive froth, which chamber is formed between downwardly inclined portions of endless conveyors and has a contour suitable for shaping the froth, spaced electrolytic conductors within said chamber and adapted to contact oppositely disposed portions of said froth in said chamber, said electrolytic conductors comprising a relatively non-conducting porous material with a conducting liquid within its pores, means for supplying froth to said chamber, and electrodes for making electrical contact with said electrolyte, whereby gas generated by current passed between said electrodes passes in series through electrolyte in each conductor and through froth in said chamber is evolved exteriorly of said chamber.

9. A process for forming porous resinous articles which comprises forming an aqueous dispersion of a member of the group consisting of thermoplastic resins, liquid resin-forming materials and rubber into a froth, incorporating said froth between and in contact with electrolyte in spaced electrolytic conductors, and passing a current through said electrolyte of said conductors into said froth between said conductors in sufficient intensity to cause said froth to retain the general shape of the mold cavity, whereby gases generated by electrolysis are not evolved in contact with said froth.

10. A method of forming sponge rubber articles from aqueous natural or artificial rubber dispersions which comprises forming a compounded rubber dispersion in a froth, disposing said froth between spaced electrodes having as the portions thereof for contact with said froth a solution of an electrolyte carried by capillary action in a relatively non-conducting material, passing electric current having a frequency below 100,000 cycles per second between said electrodes and through said froth with the electric current passing in series through said capillary-held electrolyte and then through said froth in sufficient intensity to cause said froth to retain the general shape of the space occupied between said electrodes, whereby gases generated by the electrolysis of ingredients in said froth are not evolved in contact with the rubber thereof to cause burning and scorching of the surface of the sponge rubber articles by increased localized heating.

11. In a method of producing sponge rubber articles from aqueous natural and artificial dispersions of a rubberlike material, wherein said aqueous dispersions are formed into a froth and the froth heated by treatment with an electric current, the steps which comprise contacting the froth with a solution of an electrolyte retained in suitable shape by capillary action and passing the current in series through said electrolyte and then through said froth, whereby gases generated by electrolysis of the froth are evolved out of contact with the rubber of the froth and the tendency to scorch the rubber by increased heating effect due to polarization of metallic electrodes in contact with the froth is thereby eliminated.

12. The method of claim 11 wherein the conducting electrolyte is a solution of an inorganic salt.

13. The method of claim 11 wherein the current passes through said froth at a frequency below 100,000 cycles per second.

14. The method of claim 11 in which the frequency used is about 60 cycles per second.

15. A method of forming sponge rubber articles from aqueous natural or artificial rubber dispersions which comprises forming a compounded rubber dispersion into a froth, disposing said froth in a shaping chamber formed between portions of conveyors and having at opposite portions thereof spaced electrodes, at least one of which has portions for contact with said froth of a relatively non-conductive material wetted with an electrolytic solution, and by passage of electric current between said electrodes and through the froth heating said froth substantially throughout its entirety to cause sufficient curing of said froth into a sponge rubber having the shape of said shaping chamber to permit its removal from the forming mold without permanently deforming the same.

16. A process for forming porous resinous articles which comprises forming an aqueous dispersion of a heat-softenable resin into a froth, incorporating said froth in a forming zone in contact with electrolyte contained within a porous, relatively non-conducting body, and passing current through said electrolyte and froth in sufficient intensity to effect a change in the characteristic of the resinous material and cause such froth to retain the general shape of said forming zone.

17. A process for forming porous resinous articles which comprises forming an aqueous dispersion of a liquid resin-forming material into a froth, incorporating said froth in a forming zone in contact with electrolyte contained within a porous, relatively non-conducting body, and passing current through said electrolyte and froth in sufficient intensity to effect a change in the characteristic of the resinous material and cause froth to retain the general shape of said forming zone.

18. A process for forming porous resinous articles which comprises forming an aqueous dispersion of a heat-softenable resin into a froth, incorporating said froth between spaced electrodes in electrical contact therewith, disposing an electrolyte between at least one of said electrodes and said froth, and passing said current between said electrodes through said electrolyte and through said froth to effect a change in said resinous material and cause said froth to retain the shape of said mold.

19. A method of forming porous articles from rubbery and resinous materials which comprises forming an electrically conductive froth of at least one of said materials, continuously shaping portions of said froth, subjecting said shaped portions of said froth to an alternating electrical potential difference of sufficient intensity and for sufficient time to cause said froth to become heated by the current flow therethrough and to generally retain said shaped form, and preventing localized heating of said froth by said alternating electrical potential difference by applying said potential difference to said froth through a fluid which is permeable to an electric field, which is in series with said froth and which is between said froth and at least one of the solid electrodes from which said potential difference is applied to said froth, whereby the formation of harmful amounts of gases on electrodes in contact with said froth by electrolysis thereof is avoided.

20. The method of forming sponge rubber articles from aqueous natural or artificial rubber dispersions which comprises forming a compounded rubber dispersion into a froth, continuously shaping portions of said froth, subjecting said shaped portion of said froth to an alternating potential difference to cause a current flow in said froth of sufficient intensity and for sufficient time to cause said froth generally to retain said shaped form, and preventing localized heating of said froth by said alternating potential difference by applying said potential difference to said froth through a fluid which is permeable to an electric field which is in series with the froth and which is between said froth and the electrodes connected to the source of said potential difference, and from which said current flows through said froth, whereby the formation of substantial amounts of gases in contact with said froth by electrolysis thereof is avoided.

THEODORE A. TE GROTENHUIS.